June 11, 1929.                J. A. MAY                1,716,968
                         CAN FEEDING MACHINE
                          Filed Jan. 12, 1927
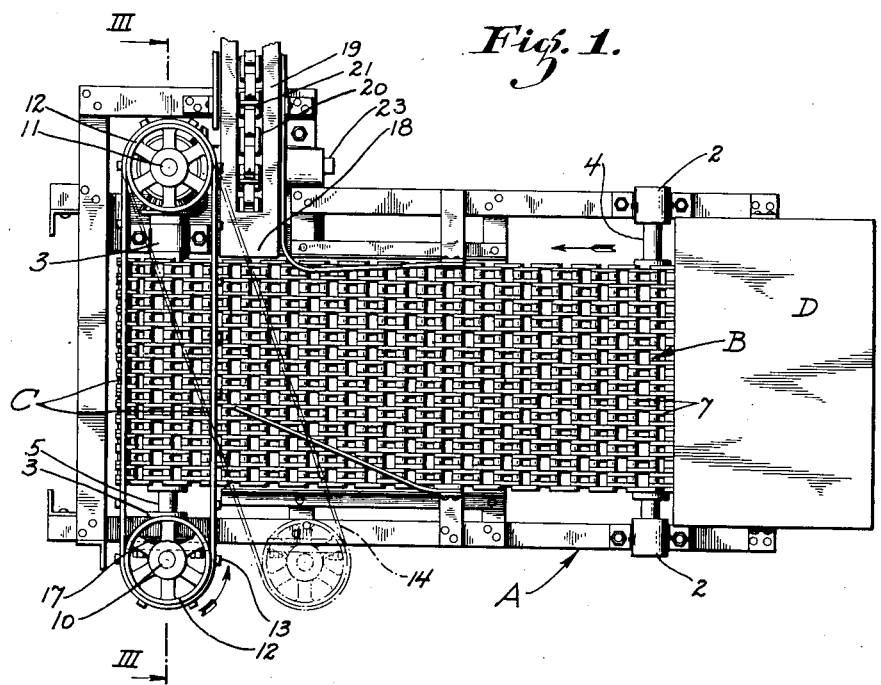
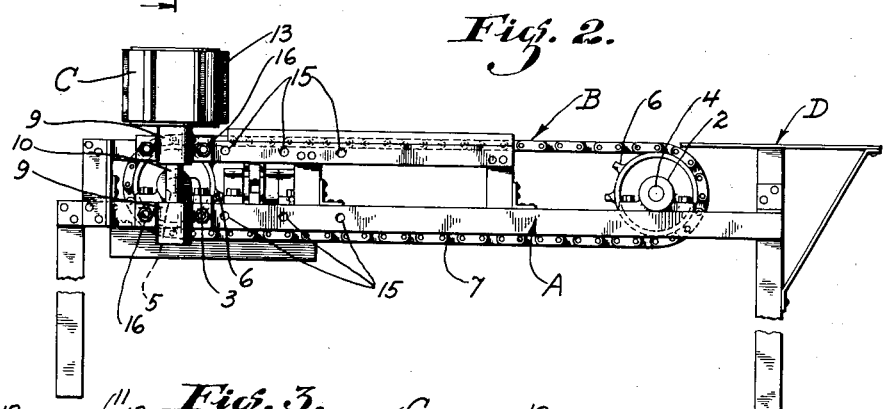
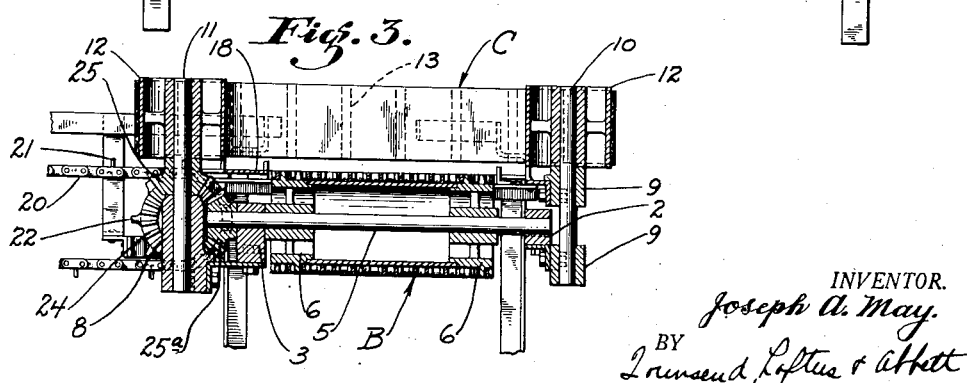
INVENTOR.
Joseph A. May.
BY
Townsend, Loftus & Abbett
ATTORNEYS.

Patented June 11, 1929.

1,716,968

UNITED STATES PATENT OFFICE.

JOSEPH A. MAY, OF HAYWARD, CALIFORNIA, ASSIGNOR TO HUNT BROS. PACKING CO., OF SAN FRANCISCO, CALIFORNIA, A CORPORATION OF DELAWARE.

CAN-FEEDING MACHINE.

Application filed January 12, 1927. Serial No. 160,544.

This invention relates to can feeding machines whereby cans or like containers may be fed or delivered one by one to other machines such as can-filling machines, syrupers, or the like.

The object of the present invention is to generally improve and simplify the construction and operation of machines of the character described; to provide a machine of this character which will handle and feed cans of practically any size, and further to provide a machine which consists of two continuously driven endless conveyors, one adapted to advance the cans in considerable numbers while the other co-operates therewith to discharge the cans one by one.

One form which the invention may assume is illustrated in the accompanying drawings in which—

Figure 1 is a plan view of the can feeding machine;

Figure 2 is a side elevation thereof;

Figure 3 is a cross section taken on line III—III, Figure 1.

Referring to the drawings in detail, particularly to Figures 1 and 2, A indicates a frame in which is mounted a pair of continuously driven endless conveyors, generally indicated at B and C. Journalled in bearings 2 and 3 disposed at opposite ends of the frame are shafts 4 and 5. Secured on the shafts are sprocket gears 6 and carried thereby is the endless continuously driven conveyor belt B. This belt is preferably constructed so as to provide a metallic anti-friction surface and in this instance consists of a series of connected chain links generally indicated at 7.

Journalled at opposite sides of the frame in bearing members 8 and 9 are a pair of vertically disposed shafts 10 and 11. Secured on the upper ends of the shafts are pulleys 12 and carried thereby is the continuously driven endless conveyor belt C. This belt may be constructed of any suitable material, such as leather, rubber or the like, and the exterior surface is in the present instance preferably provided with vertically disposed cleats 13, the function of which will hereinafter be described. The belt C is positioned above the conveyor belt B and is disposed at substantially right angles thereto. The belt may, however, be adjusted to assume an angular cross-wise position as indicated by dotted lines at 14, or it may assume intermediate angular positions, such adjustment being accompanied by drilling holes 15 in the side of the frame through which the bolts 16 securing the bearings 9 may be passed. In other words, the bearings 9 may be shifted longitudinally of the frame and bolted or secured wherever desired so that the belt may assume an angular position crosswise of the main conveyor B. Shims such as indicated at 17 may be introduced or removed as the journals 9 are shifted longitudinally of the frame so as to prevent the stretching or slacking of the belt when adjusting the same. The cans to be fed by the machine and discharged thereby one by one are placed on the feeding table generally indicated at D. This table is disposed on the same level as the upper surface of the conveyor B and the cans may thus be pushed off the feeding table directly on the conveyor which advances the cans towards the second conveyor C. The cleats 13 on the outer face of this conveyor engage the cans and transfer them laterally with relation to the belt to a discharging point indicated at 18. The cans are here delivered to a can runway, 19, in which is mounted an endless conveyor chain 20 which is provided with lugs 21 to engage and remove the cans one by one. The end of the conveyor chain 20 shown in this instance is supported by a sprocket gear 22 which is mounted on a shaft 23. This shaft forms the driving shaft of the can feeding machine. It carries a bevel gear 24 on its inner end. This bevel gear meshes with a pair of bevel gears indicated at 25 and 25ª. The bevel gear 25 is secured on shaft 11 and as such drives this shaft together with the pulleys 12 and the conveyor belt C carried thereby. The bevel gear 25ª is secured on shaft 5 and as such drives the sprocket gears 6 and the main conveyor belt B carried thereby. The conveyors are thus all driven in unison and the cans delivered to the main conveyor from the feeding table D are thus advanced and removed one by one by means of the conveyor C by which they are discharged into the can runway and there advanced to a filling machine, a syruper or whatever the case may be, through means of the lugs 21 on the conveyor chain 20.

In actual practise it has been found that the discharging conveyor C can usually be disposed at right angles to the main conveyor B as shown in Figure 1. With certain grades or sizes of cans it has been found that slippage of the cans with relation to the conveyor C will sometimes take place. In such instances the conveyor C is angularly adjusted as indicated by dotted lines at 14. Such angular adjustment of the belt reduces the slipping tendency and lateral removal of the cans with relation to the belt B is accordingly insured.

The machine illustrated is exceedingly simple and substantial in construction. It will handle or feed cans of practically any size and the cans may furthermore be indiscriminately placed in considerable numbers on the conveyor B. They are advanced by this conveyor to the second conveyor C and are here removed one by one and delivered to the can runway 19. The conveyor 20 mounted in this runway feeds the cans directly into the machine to be operated and comparatively little if any attention is required on the part of the operator.

While certain features of the present invention are more or less specifically described and illustrated, I wish it understood that varying changes may be resorted to within the scope of the appended claims. It should also be understood that the materials and finish of the several parts employed may be such as experience or varying conditions may demand.

Having thus described my invention, what I claim and desire to secure by Letters Patent is—

1. A can feeding machine, comprising a horizontally disposed, continuously driven conveyor belt adapted to receive and advance a plurality of cans, a second continuously driven conveyor belt traversing said belt and disposed above the same, said second named belt being disposed edgewise with relation to the surface of the first belt and adapted to engage and remove the cans one by one, and means permitting angular adjustment of the second named belt with relation to the first named belt.

2. A can feeding mechanism comprising a frame, a longitudinally disposed endless conveyor mounted in the frame, a second endless conveyor mounted in the frame and disposed above said first mentioned endless conveyor in edgewise relation to the surface thereof, and means permitting shifting of one end of said second endless conveyor in said frame longitudinally of the first mentioned endless conveyor to vary the angle between the longitudinal axes of said conveyors.

3. A can feeding mechanism comprising a frame, a horizontally disposed endless conveyor mounted in the frame, a second endless conveyor mounted in the frame and disposed above said first mentioned endless conveyor in edgewise relation to the surface thereof, means permitting shifting of one end of said second endless conveyor in said frame longitudinally of the first mentioned endless conveyor to vary the angle between the longitudinal axes of said conveyors, and means to adjust the tension of said second endless conveyor as the end of the same is moved longitudinally of the first mentioned endless conveyor.

JOSEPH A. MAY.